United States Patent
Benjebbour et al.

(10) Patent No.: US 10,356,727 B2
(45) Date of Patent: Jul. 16, 2019

(54) USER EQUIPMENT AND RADIO BASE STATION

(71) Applicant: NTT DOCOMO, INC., Tokyo (JP)

(72) Inventors: Anass Benjebbour, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/510,439

(22) PCT Filed: Jun. 12, 2015

(86) PCT No.: PCT/JP2015/066999
§ 371 (c)(1),
(2) Date: Mar. 10, 2017

(87) PCT Pub. No.: WO2016/038960
PCT Pub. Date: Mar. 17, 2016

(65) Prior Publication Data
US 2017/0265145 A1    Sep. 14, 2017

(30) Foreign Application Priority Data
Sep. 11, 2014    (JP) .................................. 2014-185118

(51) Int. Cl.
*H04B 1/16*    (2006.01)
*H04W 52/24*    (2009.01)
(Continued)

(52) U.S. Cl.
CPC .......... *H04W 52/24* (2013.01); *H04B 7/0639* (2013.01); *H04J 11/0043* (2013.01);
(Continued)

(58) Field of Classification Search
CPC ............... H04W 72/082; H04W 24/10; H04W 72/0453; H04W 52/325; H04W 72/0473;
(Continued)

(56) References Cited

U.S. PATENT DOCUMENTS

2011/0105064 A1    5/2011    Kusano et al.
2014/0050279 A1    2/2014    Kishiyama
(Continued)

FOREIGN PATENT DOCUMENTS

JP    2013/009290 A    1/2013
JP    2013-247513 A    12/2013
(Continued)

OTHER PUBLICATIONS

International Search Report issued in corresponding application No. PCT/JP2015/066999 dated Jul. 28, 2015 (4 pages).
(Continued)

*Primary Examiner* — Tu X Nguyen
(74) *Attorney, Agent, or Firm* — Osha Liang LLP

(57) ABSTRACT

For each UE, a base station determines the number of streams for transmitting a data signal, performs different precoding on the data signal depending on the UE, and allocates different transmission powers to at least two UEs. The base station transmits streams addressed to the at least two UEs in a form in which these streams are non-orthogonally mixed, with transmission powers that are different for the UEs. For each of the streams addressed to these UEs, the base station estimates predictive indices for these UEs from channel state information determined by the UEs to which those streams are addressed, and, based on the predictive indices, allocates different transmission powers to those UEs such that the better the predictive index is, the lower the transmission power is.

2 Claims, 8 Drawing Sheets

(51) Int. Cl.

| | | |
|---|---|---|
| *H04W 52/26* | (2009.01) | |
| *H04B 7/06* | (2006.01) | |
| *H04J 11/00* | (2006.01) | |
| *H04W 52/14* | (2009.01) | |
| *H04L 1/00* | (2006.01) | |
| *H04L 5/00* | (2006.01) | |
| *H04W 72/04* | (2009.01) | |
| *H04W 88/02* | (2009.01) | |
| *H04W 88/08* | (2009.01) | |
| *H04B 7/0417* | (2017.01) | |
| *H04L 27/26* | (2006.01) | |

(52) U.S. Cl.
CPC .......... *H04L 1/0003* (2013.01); *H04L 5/0048* (2013.01); *H04L 5/0057* (2013.01); *H04W 52/143* (2013.01); *H04W 52/243* (2013.01); *H04W 52/26* (2013.01); *H04W 72/0473* (2013.01); *H04B 7/0417* (2013.01); *H04L 5/0051* (2013.01); *H04L 27/261* (2013.01); *H04W 52/241* (2013.01); *H04W 52/262* (2013.01); *H04W 88/02* (2013.01); *H04W 88/08* (2013.01)

(58) Field of Classification Search
CPC ........... H04W 72/1231; H04W 52/367; H04W 52/143
USPC ............................... 455/226.3, 283, 284, 337
See application file for complete search history.

(56) References Cited

U.S. PATENT DOCUMENTS

| | | | |
|---|---|---|---|
| 2015/0349866 A1 | 12/2015 | Benjebbour et al. | |
| 2015/0351081 A1* | 12/2015 | Zhu | H04J 11/003 370/329 |
| 2016/0029350 A1 | 1/2016 | Kishiyama et al. | |
| 2018/0146382 A1* | 5/2018 | Porat | H04L 5/00 |

FOREIGN PATENT DOCUMENTS

| | | | |
|---|---|---|---|
| WO | 2009/157513 A1 | 12/2009 | |
| WO | 2014/104117 A1 | 7/2014 | |
| WO | 2014/122994 A1 | 8/2014 | |

OTHER PUBLICATIONS

Anass Benjebbour et al., "System-Level Performance of Downlink NOMA for Future LTE Enhancements"; IEEE Globecom; Dec. 2013 (8 pages).

Extended European Search Report issued in corresponding European Patent Application No. 15840122.4, dated Jul. 5, 2017 (10 pages).

Chen et al., "Evaluations of Downlink Non-Orthogonal Multiple Access (NOMA) Combined with SU-MIMO," 2014 IEEE 25th International Symposium on Personal, Indoor and Mobile Radio Communications, pp. 1887-1891 (5 pages).

Extended European Search Report issued in corresponding European Patent Application No. 18152543.7, dated Mar. 20, 2018 (9 pages).

Huawei et al., "Discussion on network assistance signalling for NAICS receivers", 3GPP TSG RAN WG1 Meeting #76, R1-140060, Prague, Czech Republic, Feb. 10-14, 2014 (6 pages).

Pantech, "DMRS Indicator of DL signalling for Non-transparent MU-MIMO", 3GPP TSG-RAN WG1 #61bis, R1-103614, Dresden, Germany, Jun. 28-Jul. 2, 2010 (4 pages).

Office Action issued in counterpart Japanese Patent Application No. 2016-547729, dated Jan. 8, 2019 (8 pages).

NTT DOCOMO; "Further Views on CSI Enhancements for NAICS"; 3GPP TSG RAN WG1 Meeting #78, R1-143230; Dresden, Germany; Aug. 18-22, 2014 (6 pages).

3GPP TR 36.866 V12.0.1; "3rd Generation Partnership Project; Technical Specification Group Radio Access Network; Study on Network-Assisted Interference Cancellation and Suppression (NAIC) for LTE (Release 12)"; Mar. 2014 (64 pages).

MediaTek Inc.; "General requirements and considerations for blind detection in typical operations and simulation conditions/assumptions"; 3GPP TSG-RAN WG4 #76bis, R4-141733; San Jose Del Cabo, Mexico; Mar. 31-Apr. 4, 2014 (7 pages).

MediaTek Inc.; "Discussion on the feasibility of network assistance"; 3GPP TSG-RAN WG1 #76, R1-140248; Prague, Czech Republic; Feb. 10-14, 2014 (6 pages).

Huawei, HiSilicon.; "Discussion on network coordination for advanced receivers"; 3GPP TSG RAN WG1 Meeting #76, R1-140061; Prague, Czech Republic; Feb. 10-14, 2014 (4 pages).

Office Action issued in counterpart European Patent Application No. 18152543.7, dated Jan. 28, 2019 (7 pages).

Notification of Reasons for Refusal issued in the counterpart Japanese Patent Application No.: 2016-547729, dated Apr. 2, 2019 (9 Pages).

* cited by examiner

USER EQUIPMENT AND RADIO BASE STATION

TECHNICAL FIELD

The present invention relates to a base station, a user equipment, and a radio communication system.

BACKGROUND ART

Orthogonal multiple access (OMA), in which multiple signals do not interfere with each other, is widely used in communication between a base station and user equipments (e.g., mobile stations) in a mobile communication network. With orthogonal multiple access, different radio resources are allocated to different user equipments. CDMA (code division multiple access), TDMA (time division multiple access), and OFDMA (orthogonal frequency division multiple access) are examples of orthogonal multiple access. For example, in Long Term Evolution (LTE) standardized by the 3GPP, OFDMA is used in downlink communication. With OFDMA, different frequencies are allocated to different user equipments.

In recent years, non-orthogonal multiple access (NOMA) has been proposed as a method for communication between a base station and user equipments (e.g., see Patent Document 1). With non-orthogonal multiple access, the same radio resources are allocated to different user equipments. More specifically, a single frequency is allocated to different user equipments at the same time. In the case of applying non-orthogonal multiple access to downlink communication, a base station transmits a signal with a large transmission power to a user equipment (commonly a user equipment at a cell area edge) with a large path loss, i.e., a user equipment with a small reception SINR (signal-to-interference-plus-noise-power ratio), and the base station transmits a signal with a small transmission power to a user equipment (commonly a user equipment at the center of a cell area) with a small path loss, i.e., a user equipment with a large reception SINR. Accordingly, the signal received by each user equipment is influenced by interference caused by signals addressed to other user equipments.

In this case, each user equipment demodulates the signal addressed to that user equipment using a power difference. Specifically, each user equipment first demodulates the signal with the highest reception power. Because this demodulated signal is a signal addressed to a user equipment closest to the cell area edge (or more accurately, the user equipment with the lowest reception SINR), the user equipment closest to the cell area edge (the user equipment with the lowest reception SINR) ends demodulation. Each of the other user equipments cancels out the interference component corresponding to that demodulated signal in the received signals using an interference canceler, and demodulates the signal with the second-highest reception power. Because this demodulated signal is a signal addressed to a user equipment that is the second-closest to the cell area edge (or more accurately, the user equipment with the second-lowest reception SINR), the user equipment that is the second-closest to the cell area edge (has the second-lowest reception SINR) ends demodulation. By thus repeating the demodulation and canceling out of signals with high power, all of the user equipments can demodulate the signals addressed to them.

By combining non-orthogonal multiple access with orthogonal multiple access, it is possible to increase the capacity of the mobile communication network in comparison to using orthogonal multiple access alone. That is, in the case of using orthogonal multiple access alone, it is not possible to allocate a certain radio resource (e.g., a frequency) to multiple user equipments at the same time. In contrast, in the case of combining non-orthogonal multiple access and orthogonal multiple access, a certain radio resource can be allocated to multiple user equipments at the same time.

MIMO (Multiple Input Multiple Output) is used in mobile communication networks. In MIMO, precoding is performed at a base station in order to perform multi-stream beamforming thereat.

RELATED ART DOCUMENTS

Patent Document

Patent Document 1: Japanese Patent Application Laid-Open Publication No. 2013-009290

SUMMARY OF THE INVENTION

Problem to be Solved by the Invention

In a system that combines NOMA and OFDMA, in the case of further combining therewith the idea of single-user MIMO (SU-MIMO) (in the case of transmitting multiple layers to each user equipment by using multiple beams), the user equipment calculates the reception SINRs for the multiple layers (streams). For example, in 2×2 SU-MIMO, when the base station transmits two streams to each of two user equipments, the base station receives four CQIs (channel quality indicators) corresponding to four reception SINRs from these user equipments. However, in a case where the reception SINR of a first stream for a first user equipment is higher than the reception SINRs of the two streams for a second user equipment, and the reception SINR of a second stream for the first user equipment is lower than the reception SINRs of the two streams for the second user equipment, there is no appropriate policy regarding which of the user equipments is to be allocated a higher transmission power.

In a system that combines NOMA and OFDMA, in the case of further combining therewith the idea of single-user MIMO (SU-MIMO) (in the case of transmitting multiple layers to each user equipment by using multiple beams), precoding is performed on the multiple layers (streams), and it is difficult for the base station to perfectly predict or recognize the actual downlink reception qualities of the multiple streams at each of the user equipments. For this reason, in the allocation of transmission powers to the user equipments in NOMA, there is a concern that a higher transmission power will be allocated to the user equipment at which the actual downlink reception quality is higher.

In view of this, the present invention provides a base station capable of increasing the efficiency of the overall system in the case of transmitting multiple streams to each of multiple user equipments. The present invention also provides a user equipment capable of appropriately decoding a desired data signal independent of a result of transmission power allocation to multiple user equipments at the base station. Furthermore, the present invention provides a radio communication system that includes such a base station and a user equipment.

Means of Solving the Problems

A base station according to the present invention is a base station including: a stream number determiner configured to determine, for each of a plurality of user equipments, the number of streams for transmitting a data signal; a precoder configured to perform different precodings on the data signals for the plurality of user equipments; a transmission power determiner configured to allocate different transmission powers to at least two of the user equipments; a radio transmitter configured to transmit streams addressed to the at least two user equipments in a form in which these streams are non-orthogonally mixed, with the transmission powers that are different for the at least two user equipments; and a predictive index estimator configured to estimate predictive indices for the at least two user equipments based on pieces of channel state information determined for respective ones of the streams addressed to the at least two user equipments, the channel state information being determined by the at least two user equipments, and the predictive index estimator estimates a single predictive index for each user equipment based on the pieces of channel state information with regard to a plurality of streams that correspond to each user equipment, and based on the predictive indices for the at least two user equipments, the transmission power determiner allocates different transmission powers to the at least two user equipments such that the better a predictive index is, the lower a transmission power is.

A user equipment according to the present invention is a user equipment including: a radio receiver configured to receive, from a base station, a mixed data signal that includes a plurality of non-orthogonal data signals having different powers and addressed to a plurality of user equipments in one-to-one correspondence, the plurality of user equipments including the subject user equipment; a replica signal generator configured to generate a replica signal of an interference data signal addressed to another user equipment, the interference data signal being included in the mixed data signal; a correctness determiner configured to determine whether the replica signal is correct; an interference canceler configured to cancel out, from the mixed data signal, the replica signal corresponding to the interference data signal, if the correctness determiner determines that the replica signal is correct; and a desired data signal decoder configured to decode a desired data signal addressed to the subject user equipment from the mixed data signal, and if the correctness determiner determines that the replica signal is correct, the desired data signal decoder decodes the desired data signal from the mixed data signal from which the replica signal has been canceled out by the interference canceler, and if the correctness determiner determines that the replica signal is not correct, the desired data signal decoder decodes the desired data signal from the mixed data signal received by the radio receiver.

Effect of the Invention

The base station according to the present invention estimates predictive indices for at least two user equipments that are subjected to non-orthogonal multiple access, based on the channel state information (CSI, which includes a channel quality indicator (CQI), a precoding matrix indicator (PMI), and a rank indicator (RI)) determined by the user equipments to which the respective streams are addressed. The base station allocates different transmission powers to the at least two user equipments such that the better the predictive index is, the lower the transmission power is, based on the predictive indices for the at least two user equipments. In other words, a higher transmission power is allocated to a user equipment for which the predictive index estimated based on the channel state information is poorer. Accordingly, the efficiency of the overall system can be increased in the case of transmitting a plurality of streams to each of a plurality of user equipments.

The user equipment according to the present invention is, in a case where it is subjected to non-orthogonal multiple access and receives a mixed data signal that includes a plurality of non-orthogonal data signals, the user equipment demodulates (and also decodes, depending on the case) an interference data signal included in the mixed data signal regardless of the transmission power allocation at the base station. If the correctness determiner determines that the demodulation result or the decoding result, i.e., the replica signal, is correct, the user equipment decodes the desired data signal from the mixed data signal from which the replica signal corresponding to the interference data signal has been canceled out by the interference canceler. If the correctness determiner determines that the demodulation result or the decoding result, i.e., the replica signal, is not correct, the user equipment decodes the desired data signal from the mixed data signal without using the interference canceler. Accordingly, the desired data signal can be appropriately decoded independent of a result of transmission power allocation to the plurality of user equipments at the base station.

In conventional NOMA, each user equipment needs to know the necessity of canceling out an interference component addressed to another user equipment from a received signal. For this purpose, information regarding the transmission power allocated to user equipments by the base station or information indicating the necessity of canceling out the interference component needs to be transmitted to each user equipment. However, the user equipment according to the present invention demodulates (and also decodes, depending on the case) the interference data signal included in the mixed data signal regardless of the allocation of transmission powers at the base station. Accordingly, the user equipment does not need to know the necessity of canceling out the interference data signal addressed to another user equipment from the mixed data signal. Because the base station thus does not need to transmit the information regarding the transmission power allocated to the user equipment or the information indicating the necessity of canceling out the interference data signal addressed to another user equipment from the mixed data signal received by the user equipment, the quantity of information notified from the base station to the user equipments is reduced. In addition, in a case where the base station fails to correctly set the combination of user equipments subjected to non-orthogonal multiple access or power allocation, the user equipment can determine, by itself, whether to remove the interference data signal.

MODES FOR CARRYING OUT THE INVENTION

Figure 1:
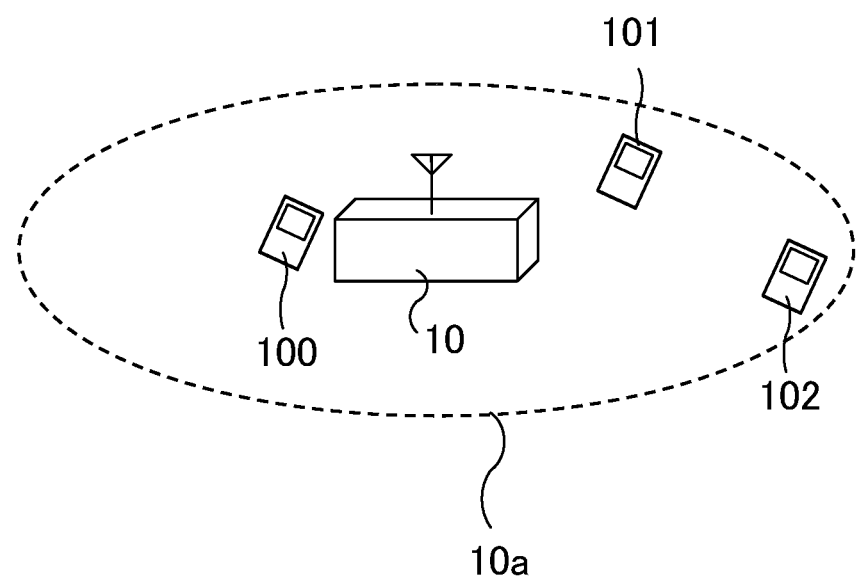
FIG. 1 is a schematic diagram showing a base station and user equipments for describing an overview of non-orthogonal multiple access.

Hereinafter, various embodiments of the present invention will be described with reference to the accompanying drawings. First, an overview of non-orthogonal multiple access (NOMA) in the case of conventional SISO and/or SIMO will be described. As shown in FIG. 1, a base station 10 communicates with multiple user equipments (UEs) 100 to 102. In FIG. 1, reference numeral 10a indicates a cell area of the base station 10. The UE 102 is at the cell area edge, i.e., the position closest to the boundary of the cell area 10a, is the farthest from the base station 10, and has the largest path loss (i.e., has the smallest reception SINR). The UE 100 is near the center of the cell area 10a, is the closest to the base station 10, and has the smallest path loss (i.e., has the largest reception SINR). The UE 101 is closer to the base station 10 than the UE 102 is, and is farther from the base station 10 than the UE 100 is.

Figure 2:
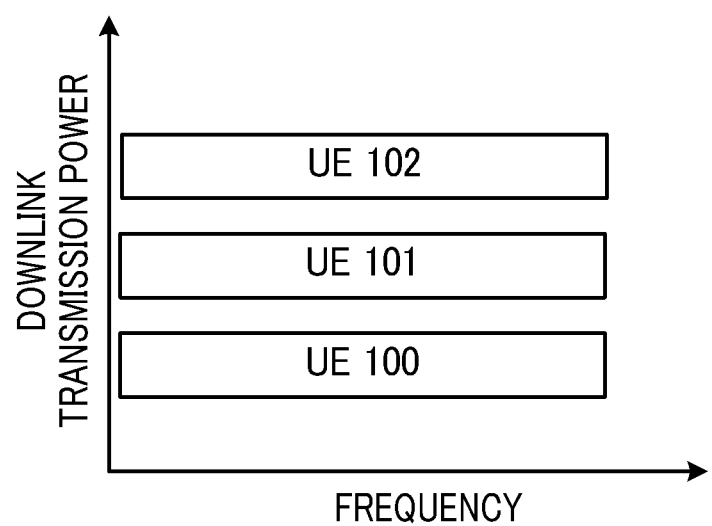
FIG. 2 is a diagram showing an example of allocation of downlink transmission powers to user equipments by a base station in non-orthogonal multiple access.

FIG. 2 is a diagram showing an example of allocation of downlink transmission powers to the UEs by the base station in NOMA. The base station 10 performs downlink data transmission using the same frequency at the same time for the UEs 100 to 102. In other words, the same frequency and the same time period are allocated to the UEs 100 to 102. The base station 10 uses the highest downlink transmission power to perform transmission to the UE 102, which is the most remotely-located, and uses the lowest downlink transmission power to perform transmission to the UE 100, which is located the closest to the base station 10.

Note that the UEs connected to the base station 10 are not limited to the UEs 100 to 102. NOMA can be combined with orthogonal multiple access, and a frequency different from the frequency allocated to the UEs 100 to 102 may be allocated to UEs other than the UEs 100 to 102. The number of UEs to which the same frequency is allocated at the same time (the number of UEs to be multiplexed using NOMA) is not limited to being three, and may be two, four, or more.

From the standpoint of the UEs 100 to 102, the data signal with the highest reception power is the data signal addressed to the UE 102, and the data signal with the lowest reception power is the data signal addressed to the UE 100. The UEs 100 to 102 each first demodulate the data signal with the highest reception power. Because this demodulated data signal is the data signal addressed to the UE 102, which is at the position that is the closest to the boundary of the cell area 10a, the UE 102 ends demodulation and uses this demodulated data signal. The other UEs 100 and 101 each use an interference canceler to remove, from the received signal, the interference component (replica signal) corresponding to the demodulated data signal, and demodulate the data signal with the second-highest reception power. Because this demodulated data signal is the data signal addressed to the UE 101, which is at the position that is the second-closest to the boundary of the cell area 10a, the UE 101 ends demodulation and uses this demodulated data signal. By thus repeating the demodulation and canceling out of the data signals with high reception powers as necessary, all of the UEs 100 to 102 can demodulate the data signals addressed to them. Thus, with NOMA, a UE cancels out the data signal (interference signal) that is transmitted from the serving base station and are addressed to other UEs until the data signal addressed to that UE is demodulated.

Figure 3:
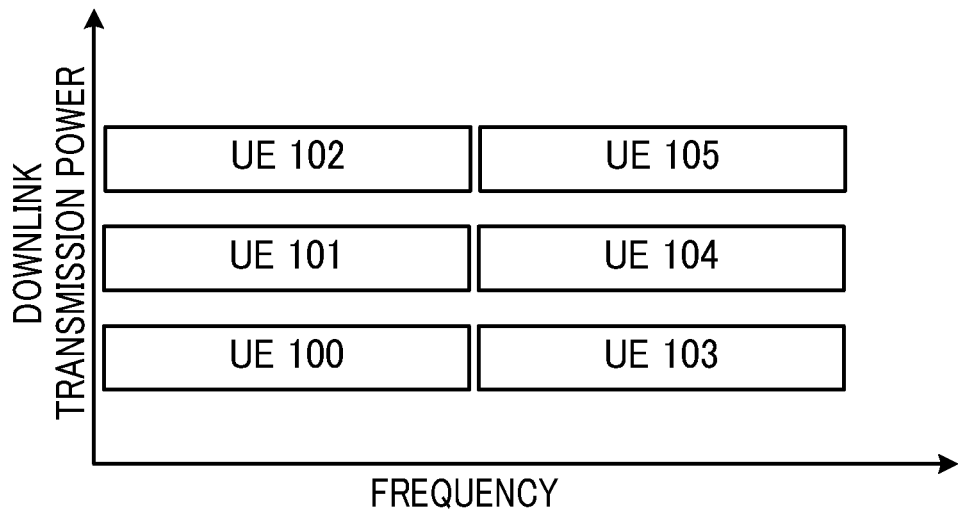
FIG. 3 is a diagram showing another example of allocation of downlink transmission powers to user equipments by a base station in non-orthogonal multiple access.

FIG. 3 shows another example of allocation of downlink transmission powers to user equipments by the base station with NOMA. UEs 100 to 102 constitute one group of data apparatuses with different transmission powers, and UEs 103 to 105 constitute another group of data apparatuses with different transmission powers. A UE with a low reception power (e.g., UE 103) demodulates the data signals addressed to other UEs that belong to the same group as that UE and having higher reception powers (e.g., UEs 104 and 105), and cancels out replica signals that result from the demodulation.

Figure 4:
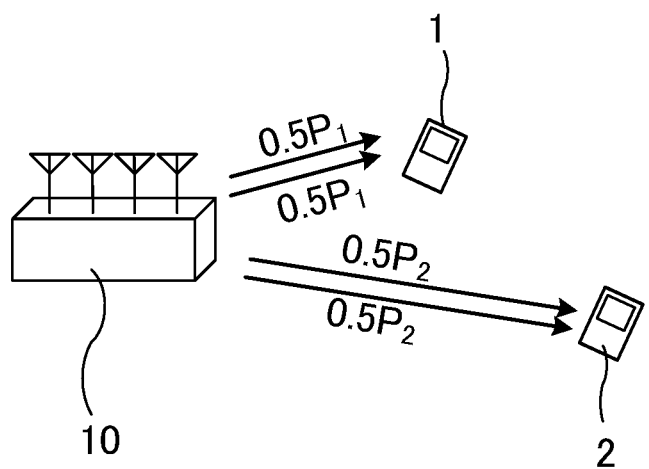
FIG. 4 is a diagram showing an overview of combination of non-orthogonal multiple access and MIMO.

FIG. 4 shows an overview of combination of NOMA and SU-MIMO (a method of transmitting multiple layers to each UE by using multiple beams). The base station 10 can transmit multiple streams (layers or ranks) to each UE by performing precoding. In FIG. 4, in the case of providing two transmission antennas in the base station and two reception antennas in each UE, and multiplexing the two UEs 1 and 2 using NOMA, a total of four streams can be transmitted. According to conventional technique, the UE 1, which is closer to the base station 10, cancels out a replica signal corresponding to the signal with a high power for the UE 2, and demodulates the desired signal addressed to the UE 1.

In the case of MIMO, the transmission power for each stream to be transmitted to a UE is obtained by equally dividing the transmission power for the UE by the number of streams. This is called EQPA (equal power allocation). For example, when the transmission power for the UE 1 is $P_1$ and two streams are to be transmitted to the UE 1, the transmission power for each stream is $0.5P_1$. If one stream is to be transmitted to the UE 1, the transmission power for this stream is $P_1$. When the transmission power for the UE 2 is $P_2$ and two streams are to be transmitted to the UE 2, the transmission power for each stream is $0.5P_2$. If one stream is to be transmitted to the UE 2, the transmission power for this stream is $P_2$.

The number of streams for a UE is selected by the UE using publicly known rank adaptation. That is, a UE feeds back rank information (rank indicator; RI) indicating the optimum number of streams to the base station 10 based on, for example, the reception SINR. The base station 10 controls the number of streams to be transmitted to each of UEs based on the rank information. The number of streams for a UE with good reception quality may be increased, whereas only a small number of streams can be allocated to a UE with poor reception quality. However, in the case of NOMA, power allocation to multiple users is performed by the base station. For this reason, the rank (before power allocation) selected by each UE does not always coincide with the optimum rank for that UE after power allocation is performed by the base station. Thus, the rank may be ultimately determined by the base station 10, rather than by the UE. In this case, the UE may determine a CQI and a PMI (precoding matrix indicator) for both a case where the rank of the UE is 1 with respect to the base station 10 and a case where the rank is 2, and feed back the determined CQI and PMI to the base station. The base station may determine the appropriate rank in accordance with UEs to be paired through NOMA and notify the UE of the determined rank. That is, each UE may determine multiple CQIs and multiple PMIs for multiple cases with different numbers of streams transmitted from the base station 10 to that UE, and feed back the multiple CQIs and the multiple PMIs to the base station 10. The base station 10 (a later-described scheduler 46 that serves as a stream number determiner) may determine the number of streams to be transmitted to the UE based on the multiple CQIs and the multiple PMIs fed back from the UE, and information at the time of pairing for NOMA (e.g., the transmission power allocated to each UE, and a later-described predictive SINR for each stream for the UE).

In a system that combines NOMA and OFDMA, in the case of further applying MIMO thereto and transmitting multiple layers to each UE by using multiple beams, each UE calculates the reception SINRs for multiple layers (streams). For example, in a case where the base station transmits two streams to each of two UEs 1 and 2 as shown in FIG. 4, each UE measures two reception SINRs, and feeds back two CQIs corresponding to the two reception SINRs to the base station. Accordingly, the base station receives a total of four CQIs from these UEs 1 and 2. However, in a case where the reception SINR of a first stream for the UE 1 is higher than the reception SINRs of the two streams for the UE 2, and the reception SINR of a second stream for the UE 1 is lower than the reception SINRs of the two streams for the UE 2, there is no appropriate policy regarding which of the UEs is allocated a higher transmission power.

As will be described later, the base station according to this embodiment increases the efficiency of the overall system in the case of transmitting multiple streams to each of multiple UEs.

In a system that combines NOMA and OFDMA, in the case of further applying MIMO thereto and transmitting multiple layers to each UE by using multiple beams, precoding is performed on the multiple layers (streams), and it is difficult for the base station to perfectly predict or recognize the actual downlink reception qualities of the multiple streams at each UE. For this reason, in the allocation of transmission powers to UEs in NOMA, there is a concern that a higher transmission power might be allocated to a UE at which the actual downlink reception quality is higher. Reasons for this will be described below in detail.

As shown in FIG. 4, two transmission antennas of one base station 10 transmitting two streams to each of two UEs is conceivable as 2×2 MIMO. In this case, the signal received by the UE 1, $Y_1$, is a 2×1 matrix, and is expressed by Equation (1) below:

$$Y_1 = H_1 W_1 \sqrt{P_1} S_1 + H_1 W_2 \sqrt{P_2} S_2 + N_1 \quad (1)$$

Here, $H_1$ indicates a channel matrix for a transmission channel from the base station 10 to the UE 1, and is a 2×2 matrix in 2×2 MIMO. $W_1$ indicates a precoding matrix for the UE 1, and is a 2×2 matrix in 2×2 MIMO. $W_2$ indicates a precoding matrix for the UE 2, and is a 2×2 matrix in 2×2 MIMO. $S_1$ is a 1×2 matrix indicating transmission data symbols addressed to the UE 1. $S_2$ is a 1×2 matrix indicating transmission data symbols addressed to the UE 2. $N_1$ indicates an interference power from another base station and additive white Gaussian noise at the UE 1.

Equation (1) can be rearranged into Equation (2):

$$Y_1 H_{E1} S_1 + H_{E2} S_2 + N_1 \quad (2)$$

Here, $H_{E1}$ indicates an equivalent channel matrix for a desired signal at the UE 1, and is expressed by Equation (3).

$$H_{E1} = H_1 W_1 \sqrt{P_1} \quad (3)$$

$H_{E1}$ indicates an equivalent channel matrix for a signal (interference signal) addressed to the UE 2 at the UE 1, and is expressed by Equation (4).

$$H_{E2} = H_1 W_2 \sqrt{P_2} \quad (4)$$

The first term on the right side in Equation (2) corresponds to the desired signal for the UE 1, and the second term on the right side corresponds to the signal (interference signal) that is addressed to the UE 2 and received by the UE 1. In conventional NOMA with SISO or SIMO, the transmission power for the desired signal for the UE 1 is configured to be lower than the transmission power for an interference signal. However, depending on a result of multiplying the channel matrix for the transmission channel from the base station 10 to the UE 1 by the precoding matrix for the UE 2 indicated by Equation (4) (equivalent channel matrix), the actual downlink reception quality of the interference signal addressed to the UE 2 at the UE 1 may lower. For this reason, there may be cases where it is better to decode the desired signal for the UE 1 without canceling out the interference signal addressed to the UE 2 than to first cancel out the interference signal addressed to the UE 2 and then decode the desired signal for the UE 1. Similarly, depending on a result of multiplying the channel matrix for the transmission channel from the base station 10 to the UE 2 by the precoding matrix for the UE 1 (equivalent channel matrix), the actual downlink reception quality of the interference signal addressed to the UE 1 at the UE 2 may sometimes be good. For this reason, there may be cases where it is better to first cancel out the interference signal addressed to the UE 1 and then decode the desired signal for the UE 2 than to decode the desired signal for the UE 2 without canceling out the interference signal addressed to the UE 1.

If a policy to allocate a higher transmission power to a UE with poorer reception quality is to be consistently carried out, the base station needs to know a result of multiplication of the channel matrix for the transmission channel from the base station to the UE 1 and the precoding matrix for the UE 2, and a result of multiplication of the channel matrix for the transmission channel from the base station to the UE 2 and the precoding matrix for the UE 1. However, the base station does not know such multiplication results.

In view of this, as will be described later, the UE according to this embodiment appropriately decodes a desired data signal independent of a result of transmission power allocation to multiple user equipments at the base station.

Figure 5:
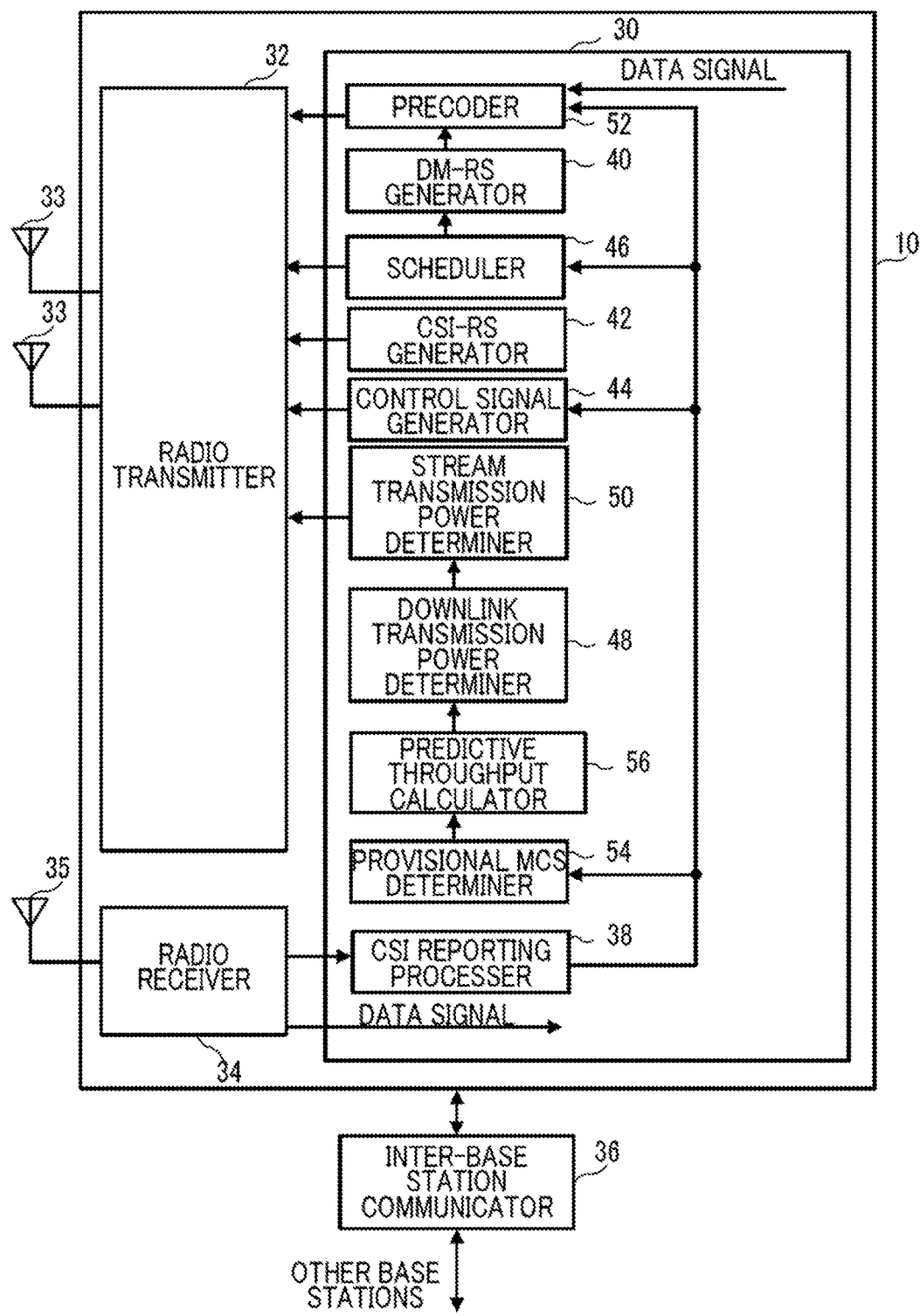
FIG. 5 is a block diagram showing a configuration of a base station according to an embodiment of the present invention.

FIG. 5 is a block diagram showing a configuration of the base station according to an embodiment of the present invention. A base station 10 includes a controller 30, a radio transmitter 32, multiple transmission antennas 33, a radio receiver 34, a reception antenna 35, and an inter-base station communicator 36.

The radio transmitter 32 is a transmission circuit for converting an electrical signal into a radio wave to be transmitted from the transmission antennas 33 in order for the base station 10 to perform radio transmission to UEs. The transmission antennas 33 constitute an adaptive antenna array. The radio receiver 34 is a reception circuit for converting the radio wave received from the reception antenna 35 into an electrical signal in order for the base station 10 to perform radio reception from the UEs. The inter-base station communicator 36 is a communication interface for the base station 10 to perform communication with another base station.

The controller 30 includes a CSI reporting processor 38, a DM-RS generator 40, a CSI-RS generator 42, a control signal generator 44, a scheduler 46, a downlink transmission power determiner 48, a stream transmission power determiner 50, a precoder 52, a provisional MCS (modulation-coding scheme) determiner 54, and a predictive throughput calculator 56. The controller 30 is a CPU (central processing unit) that operates in accordance with a computer program. The internal components of the controller 30 are functional blocks that are realized due to the controller 30 functioning in accordance with the computer program.

The controller 30 processes uplink data signals that have been transmitted from the UEs connected to the base station 10 and received by the radio receiver 34. The CSI reporting processor 38 recognizes CSI that has been reported from the UEs connected to the base station 10 and was received by the radio receiver 34. The CSI reporting processor 38 can recognize reception SINRs at the respective UEs from CQIs included in the CSI. In a case where the base station 10 transmits a data signal in multiple streams to a certain UE, that UE feeds back CQIs for respective streams to the base station 10, and the CSI reporting processor 38 can recognize the CQIs of the streams.

The scheduler 46 functions as a stream number determiner, and determines the number of streams of a downlink data signal to be transmitted to each UE, based on RIs (rank indicators) that have been reported from each UE connected to the base station 10 and that has been received by the radio receiver 34. As mentioned above, the scheduler 46 may determine the number of streams of a data signal to be transmitted to a UE based on the CQIs and PMIs.

The scheduler 46 determines resource elements (frequency resources and time resources) for transmitting a downlink data signal addressed to each of the multiple UEs connected to the base station 10, based on the CQIs at the UEs and other parameters. The scheduler 46 also determines whether to apply NOMA, and, in the case of applying NOMA, determines the UEs that are to be subjected to NOMA.

The DM-RS generator 40 generates DM-RSs to be transmitted to each UE. In a case where the base station 10 transmits a data signal in multiple streams to a certain UE, the DM-RS generator 40 generates a DM-RS for each of those streams. The CSI-RS generator 42 generates a CSI-RS (channel state information reference signal). The control signal generator 44 generates control signals (PDCCH signals) addressed to the respective UEs based on the reception SINRs at the UEs and other parameters. In a case where the base station 10 transmits a data signal in multiple streams to a certain UE, the control signal generator 44 contains, in a PDCCH signal, information indicating transmission antenna ports of the base station that is to be used in transmitting DM-RSs to that UE.

The precoder 52 performs different precodings on respective data signals addressed to multiple UEs. The precoder 52 also performs the same precoding as the precoding performed on a data signal, on a DM-RS transmitted in a stream in which the data signal is transmitted. The precoder 52 may determine a precoding matrix based on PMI that has been reported from the UEs connected to the base station 10 and received by the radio receiver 34.

The radio transmitter 32 performs radio transmission of downlink data signals, DM-RSs, CSI-RSs, and PDCCH signals.

The provisional MCS determiner 54 determines a provisional MCS (modulation-coding scheme) for data signals to be transmitted to the UEs, based on the CQIs recognized by the CSI reporting processor 38. In a case where the base station 10 transmits a data signal in multiple streams to a certain UE, the provisional MCS determiner 54 determines a provisional MCS for each stream based on a CQI for that stream.

Examples of the modulation scheme include 64 QAM (quadrature amplitude modulation), 16 QAM, and QPSK (quadrature phase shift keying). The degrees of degradation in transmission quality and the transmission speeds differ depending on the modulation level applied in the modulation scheme. The greater the modulation level is, the greater the risk of quality degradation is, but the faster the transmission speed is. That is, 64 QAM has an increased risk of quality degradation but provides a faster transmission speed. On the other hand, QPSK has a smaller risk of quality degradation but provides a slower transmission speed. If the CQI indicates a good reception SINR, the provisional MCS determiner 54 selects a modulation scheme with a greater modulation level. On the other hand, if the CQI indicates a poor reception SINR, the provisional MCS determiner 54 selects a modulation scheme with a smaller modulation level. The higher the code rate is, the greater the risk of quality degradation is, but the faster the transmission speed is. If the CQI indicates a good reception SINR, the provisional MCS determiner 54 selects a high code rate. On the other hand, if the CQI indicates a poor reception SINR, the provisional MCS determiner 54 selects a low code rate.

The predictive throughput calculator 56 operates in a case where NOMA is applied. The predictive throughput calculator 56 calculates, as a predictive index, a predictive throughput for each of the multiple UEs to which NOMA is applied, based on the provisional MCS for each of the streams addressed to the multiple UEs to which NOMA is applied. More specifically, the predictive throughput calculator 56 estimates a single predictive throughput for each UE from multiple provisional MCSs for the multiple streams for that UE. As mentioned above, the greater the modulation level is, the faster the transmission speed is. The higher the code rate is, the faster the transmission speed is. Accordingly, the predictive throughput calculator 56 can calculate a predictive throughput for each of the multiple UEs to each of which the streams are addressed, from the provisional MCSs for the respective streams.

The downlink transmission power determiner 48 operates in a case where NOMA is applied. The downlink transmission power determiner 48 allocates different transmission powers to multiple UEs to which NOMA is applied, such that the greater the predictive throughput is, the lower the transmission power is, based on the predictive throughputs for the multiple UEs to which NOMA is applied.

The stream transmission power determiner 50 operates in a case where NOMA is applied. The stream transmission power determiner 50 determines transmission powers for streams to be transmitted to the UEs based on the number of streams to be transmitted to each UE to which NOMA is applied, and on the downlink transmission powers determined by the downlink transmission power determiner 48. More specifically, based on EQPA, the stream transmission power determiner 50 equally divides the transmission power for streams to be transmitted to each UE by the number of streams.

When NOMA is applied, the radio transmitter 32 transmits a mixed data signal that includes multiple non-orthogonal data signals that have different powers and are addressed to multiple UEs in one-to-one correspondence. In a case where MIMO is also applied, the radio transmitter 32 transmits streams addressed to the multiple UEs to which NOMA is applied, in a form in which these streams are non-orthogonally mixed, with transmission powers that differ for the multiple UEs to which NOMA is applied. More specifically, the radio transmitter 32 transmits data signals in respective streams with the same frequency during the same time period and with the transmission powers determined by the stream transmission power determiner 50.

As will be described later, the MCSs that are actually applied to respective streams addressed to the multiple UEs to which NOMA is applied are determined by the scheduler 46. These MCSs are transmitted to the control signal generator 44, and are notified to the destination UEs through PDCCH signals transmitted from the radio transmitter 32.

As mentioned above, the base station 10 according to this embodiment estimates predictive indices (predictive throughputs) regarding the multiple UEs that are subjected to NOMA, from the CQIs determined by the destination UEs. More specifically, the base station 10 estimates a single predictive throughput for each UE from multiple CQIs of multiple streams for that UE. The base station 10 then allocates different transmission powers to the multiple UEs that are subjected to NOMA, such that the better the predictive index is, the lower the transmission power is, based on the predictive indices for these UEs. In other words, a higher transmission power is allocated to a UE for which a poorer predictive index is estimated based on the CQIs. Accordingly, the efficiency of the overall system can be increased in the case of transmitting multiple streams to each of the multiple UEs that are subjected to NOMA.

As mentioned above, the base station 10 calculates a predictive throughput as a predictive index. However, the base station 10 may estimate other predictive indices. For example, the CSI reporting processer 38 can recognize the reception SINR of each stream from the CQI of that stream. The controller 30 may average the reception SINRs with regard to each UE in units of decibels. For example, in a case where two streams are transmitted to the UE 1, the reception SINRs of these two streams may be averaged. In a case where two streams are transmitted to the UE 2, the reception SINRs of these two streams may be averaged. The downlink transmission power determiner 48 may allocate different transmission powers to the multiple UEs that are subjected to NOMA, such that the higher the average reception SINR is, the lower the transmission power is.

Figure 6:
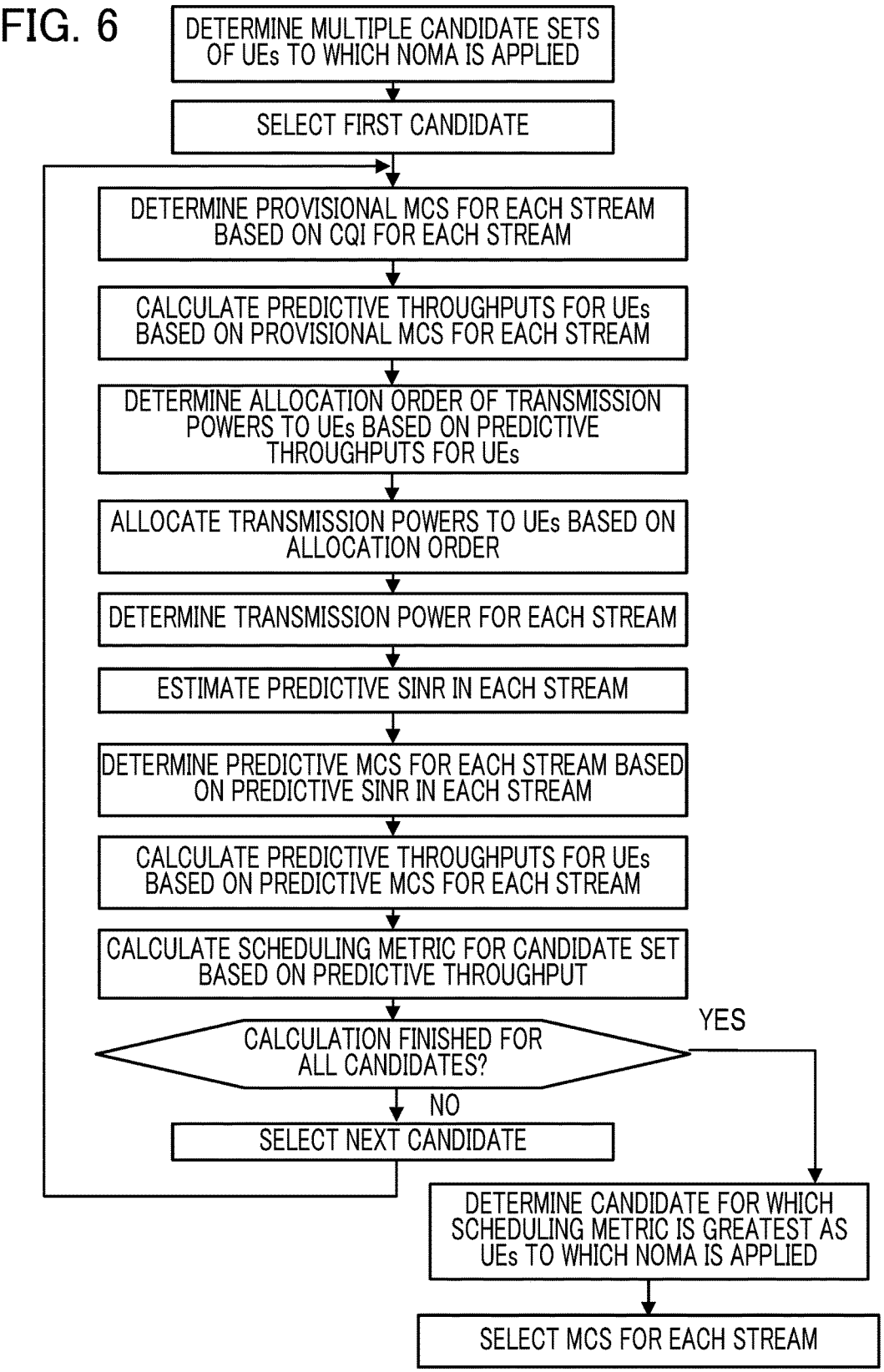
FIG. 6 is a flowchart showing processing executed by the base station.

FIG. 6 shows processing executed by the controller 30 in the base station 10. Initially, the scheduler 46 functions as a candidate determiner, and determines multiple candidate sets of UEs to be multiplexed through NOMA, with different transmission powers being allocated to UEs in each set. Next, the controller 30 selects the first candidate set from among these candidate sets.

The provisional MCS determiner 54 determines a provisional MCS for each of the streams for the UEs that constitute the selected candidate set, based on the CQIs of respective streams reported from each UE. The predictive throughput calculator 56 calculates the predictive throughputs for each UE based on the provisional MCSs for the respective streams. Based on the predictive throughputs for the respective UEs, the downlink transmission power determiner 48 determines the allocation order of the transmission powers to the UEs such that the greater the predictive throughput is, the lower the transmission power is.

Furthermore, the downlink transmission power determiner 48 determines, i.e., allocates the transmission powers for the respective UEs based on the allocation order. For example, the transmission powers for the UEs may be determined using full search power allocation (FSPA), which is described in A. Benjebbour, A. Li, Y. Saito, Y. Kishiyama, A. Harada, and T. Nakamura, "System-level performance of downlink NOMA for future LTE enhancements," IEEE Globecom, December 2013. In FSPA, every possible power allocation candidate is applied to UEs, and the transmission powers in the power allocation candidate with which the calculated scheduling metric is the greatest are determined as the transmission powers for the respective UEs.

The stream transmission power determiner 50 determines the transmission powers of the streams to be transmitted to the UEs, in accordance with EQPA, based on the determined downlink transmission power.

Next, the scheduler 46 functions as a signal to interference plus noise power ratio estimator, and estimates a predictive SINR of each stream to which it is assumed that a transmission power has been allocated in NOMA, based on the transmission powers allocated to the UEs constituting each candidate set, and the CQIs for the respective streams for these UEs. This predictive SINR can be called a NOMA CQI. For example, a NOMA $CQI_1$ for a $UE_1$ with a lower transmission power can be calculated using Equation (5), and a NOMA $CQI_2$ for a $UE_2$ with a higher transmission power can be calculated using Equation (6).

$$\text{NOMA } CQI_1 = \beta_1 CQI_1 \quad (5)$$

$$\text{NOMA } CQI_2 = \beta_2 CQI_2/(\beta_1 CQI_2+1) \quad (6)$$

Here, $CQI_1$ indicates a CQI reported from the $UE_1$, $CQI_2$ indicates a CQI reported from the $UE_2$, $\beta_1$ indicates the ratio of the transmission power for the $UE_1$ to the sum total of the transmission powers, and $\beta_2$ indicates the ratio of the transmission power for the $UE_2$ to the sum total of the transmission powers. Although the NOMA CQIs for the respective UEs have been described here, it should be apparent that the NOMA CQI of each stream for the UEs can be calculated based on Equation (5) or Equation (6). Here, the NOMA CQI for the $UE_1$ ($CQI_1$) is calculated under an assumption that interference from the $UE_2$ has been completely canceled out. The NOMA CQI for the $UE_2$ ($CQI_2$) is calculated under an assumption that decoding can be performed without canceling out interference from the $UE_1$.

The scheduler 46 calculates the NOMA CQIs based on the transmission powers allocated to the respective UEs and the CQIs of the respective streams for these UEs. However, the NOMA CQIs may alternatively be calculated based on the transmission powers allocated to the UEs, the CQIs for the respective streams for these UEs, and the precoding matrix. In any case, a NOMA CQI is an SINR of a stream in which allocation of the transmission powers to the multiple UEs is reflected.

Next, the scheduler 46 functions as a predictive modulation-coding scheme determiner, and determines a predictive MCS for each stream based on the predictive SINR (NOMA CQI) of each stream. The predictive MCS is an MCS in which the allocation of transmission powers to the multiple UEs is reflected, unlike the aforementioned provisional MCS. The scheduler 46 also calculates a predictive throughput for each UE based on the predictive MCS for the streams. Furthermore, the scheduler functions as a scheduling metric calculator, and calculates a scheduling metric for the candidate set based on predictive throughputs. The scheduling metric Q(U, Ps) is a proportional fair metric and is calculated based on the following equation.

$$Q(U, Ps) = \sum_{1=U,Ps} \frac{R_s(k \mid U, Ps, t)}{L(k, t)}$$

Here, Q(U, Ps) indicates a proportional fair scheduling metric for a candidate set U of UEs to which a set Ps of transmission powers is allocated, and is the sum total of proportional fair scheduling metrics for all UEs in the set U. $R_s(k|U, Ps, t)$ indicates a momentary predictive throughput for a user equipment k at a moment t in a subband s. L(k, t) indicates a time-average predictive throughput for the user equipment k.

Calculation of the proportional fair scheduling metric is repeated until calculation of the proportional fair scheduling metric is completed for all candidate sets. Thereafter, the scheduler 46 functions as a user equipment determiner, and determines a candidate set with which the proportional fair scheduling metric Q(U, Ps) is the greatest as the set of UEs that are multiplexed through NOMA, and different transmission powers are allocated to the UEs of the determined set. With the above processing, the efficiency of the overall system can be increased in the case of transmitting multiple streams to each of the multiple UEs that are subjected to NOMA.

Upon the UE set that is subjected to NOMA being thus determined, the scheduler 46 functions as a formal modulation-coding scheme determiner, and ultimately selects, for this set, the predictive MCSs for the respective streams determined based on the predictive SINRs (NOMA CQIs) for the streams as the formal MCSs to be used for the streams. Then, the base station 10 transmits the streams using the ultimately selected MCSs. As mentioned, each predictive MCS is an MCS in which the allocation of the transmission powers to the multiple UEs is reflected, and therefore is considered to have been optimized for transmission of the streams.

In this embodiment, to the multiple UEs that are subjected to NOMA, the base station 10 does not transmit information regarding the transmission powers allocated to the UEs or information indicating the necessity of demodulating, from a mixed data signal received by each UE, an interference data signal addressed to another UE and canceling out a replica signal equivalent to the interference data signal. Accordingly, downlink signaling between the base station 10 and the UEs can be reduced.

However, for the sake of convenience in demodulating an interference data signal and decoding a desired data signal at each UE, the radio transmitter 32 notifies (e.g., through a PDCCH signal), to the multiple UEs that are subjected to NOMA, transmission antenna ports of the base station used in transmitting DM-RSs to the multiple UEs that are subjected to NOMA. In demodulating the interference data signal and decoding the desired data signal, each UE may use a CSI-RS that is shared by multiple UEs, but may alternatively use a DM-RS that is unique to each UE. In LTE, resource elements to which DM-RSs are mapped differ depending on transmission antenna ports for DM-RSs. As a result of a UE learning the transmission antenna ports for DM-RSs for that UE and the transmission antenna ports for DM-RSs for another UE, the UE can recognize the DM-RSs for that UE and the DM-RSs for the other UE, and demodulate the interference data signal by using the DM-RSs for the other UE to cancel out the replica signal. Furthermore, as a result of learning the transmission antenna ports for the DM-RSs for the other UE, the UE can recognize the number of streams (rank number) transmitted to the other UE.

The base station 10 according to this embodiment transmits DM-RSs and CSI-RSs, but may also transmit CRSs (cell-specific reference signals). In demodulating the interference data signal and decoding a desired data signal, each UE may use a CRS that is shared by multiple UEs.

An MCS transmitted through a PDCCH signal is required for demodulating or decoding a data signal at a UE. The radio transmitter 32 transmits a PDCCH signal that indicates an MCS for each stream determined by the scheduler 46. In LTE, the PDCCH signal is transmitted in the form in which the PDCCH signal is scrambled using a C-RNTI (Cell-Radio Network Temporary ID) of the UE to which the PDCCH signal is addressed. Each UE can decrypt the PDCCH signal of that UE through blind decoding (trial and error) by using the C-RNTI allocated to the UE, and find the MCS for each stream addressed to the UE. Also, if a C-RNTI of another UE is notified from the base station 10, each UE can decrypt a PDCCH signal for the other UE through blind decoding by using the C-RNTI of the other UE, and find the MCS for each stream addressed to the other UE. The UE can decode an interference data signal addressed to the other UE and cancel out a replica signal corresponding to the interference data signal by using the MCS for each stream addressed to the other UE. However, the radio transmitter 32 may explicitly signal, to each UE, the MCS for each stream addressed to another UE that is multiplexed through NOMA.

In NOMA, there are the following two typical candidates of the interference canceler used by UEs.

Symbol-level Interference Canceller (SLIC)

This deals with an interference data signal at the symbol level (i.e., for each RE (resource element)), and cancels out a result of demodulation of the interference data signal from the mixed data signal.

Codeword-level IC (CWIC)

This decodes the interference data signal at the codeword level, and cancels out the decoding result.

Figure 7:
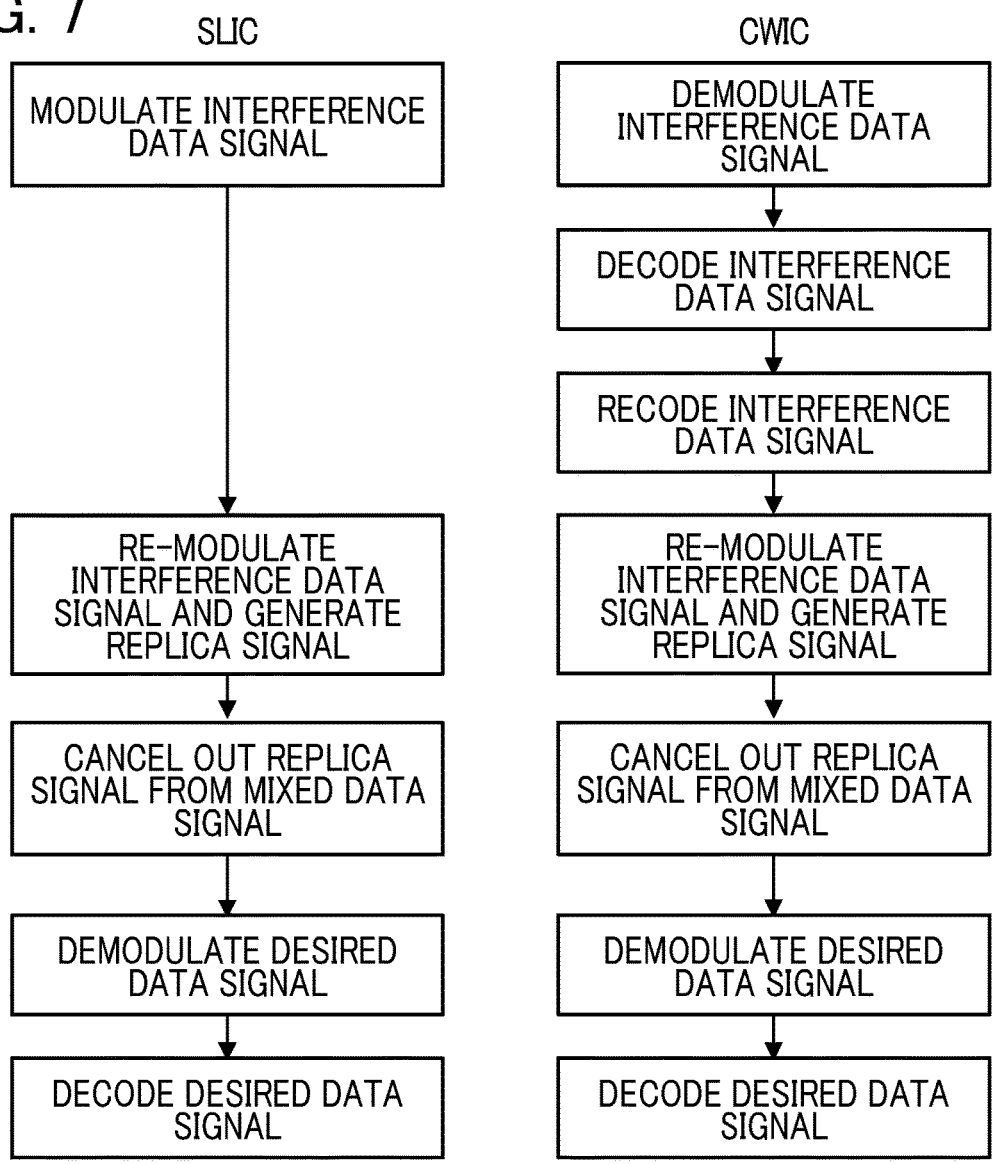
FIG. 7 shows flowcharts of processing of two typical interference cancelers used in a user equipment according to the embodiment of the present invention.

FIG. 7 shows processing flows in the SLIC and the CWIC. The SLIC re-modulates a result of demodulation of an interference data signal, to generate a replica signal of the interference data signal, cancels out the replica signal from a mixed data signal, and demodulates and decodes a desired data signal resulting from the cancellation. The CWIC demodulates and decodes the interference data signal, recodes and re-modulates the decoding result to generate a replica signal of the interference data signal, cancels out the replica signal from a mixed data signal, and demodulates and decodes a desired data signal resulting from the cancellation. In this specification, the demodulation of the interference signal at the SLIC, and combination of the demodulation and decoding of the interference signal at the CWIC are simply called "demodulation" in some cases. The UE according to the embodiment of the present invention can execute at least one of the SLIC and the CWIC.

Figure 8:
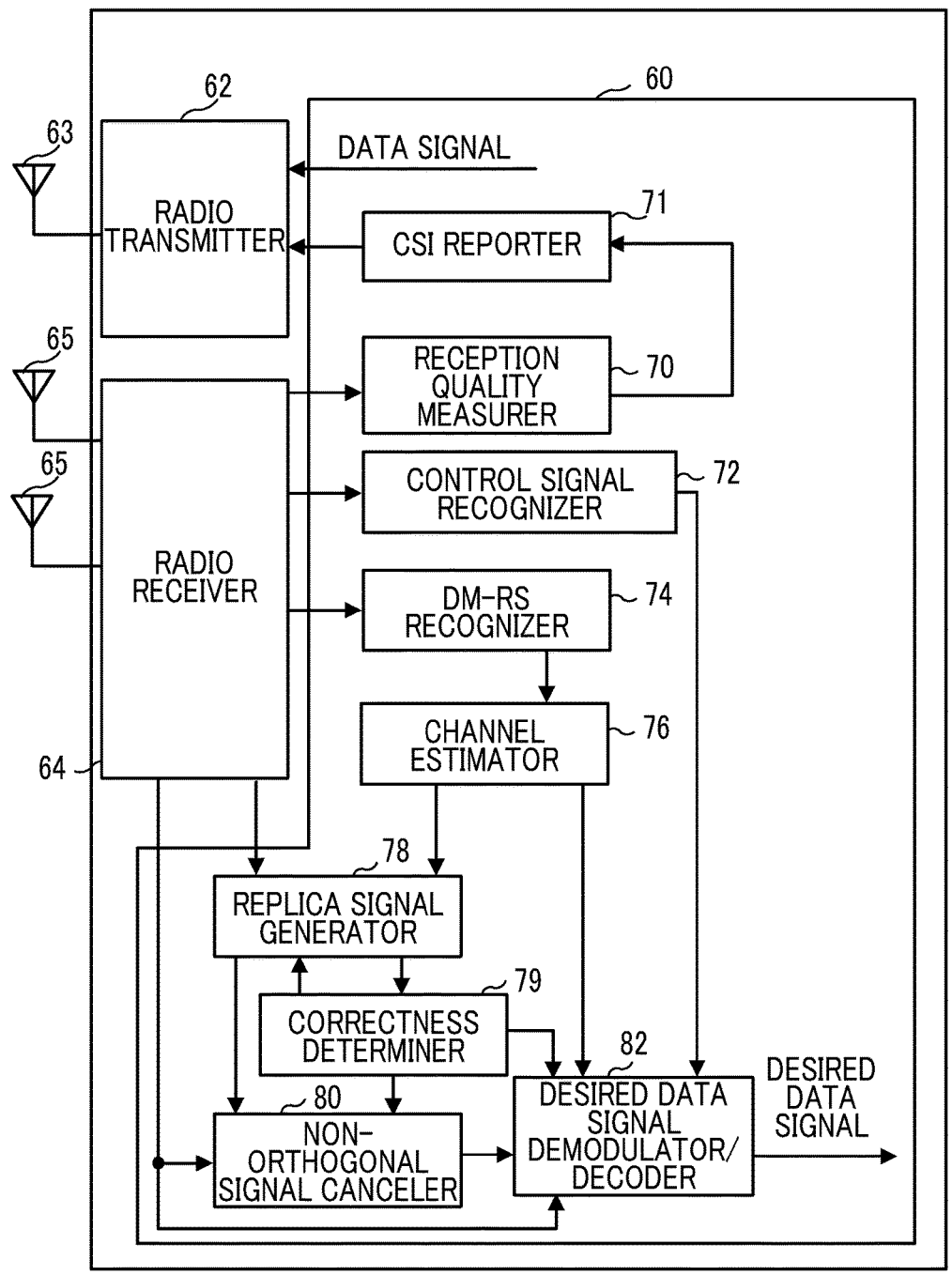
FIG. 8 is a block diagram showing a configuration of the user equipment.

Next, a configuration of the UE according to the embodiment of the present invention will be described. As shown in FIG. 8, the UE includes a controller 60, a radio transmitter 62, a transmission antenna 63, a radio receiver 64, and multiple reception antennas 65.

The radio transmitter 62 is a transmission circuit for converting an electrical signal into a radio wave to be transmitted from the transmission antenna 63 in order for the UE to perform radio transmission to a serving base station. The radio receiver 64 is a reception circuit for converting a radio wave received from the reception antennas 65 into an electrical signal in order for the UE to perform radio reception from the serving base station. The reception antennas 65 constitute an adaptive antenna array.

The controller 60 includes a reception quality measurer 70, a CSI reporter 71, a control signal recognizer 72, a DM-RS recognizer 74, a channel estimator 76, a replica signal generator 78, a correctness determiner 79, a non-orthogonal signal canceler 80, and a desired data signal demodulator/decoder (data signal decoder) 82. The controller 60 is a CPU, and the internal components of the controller 60 are functional blocks that are realized due to the controller 60 functioning in accordance with a computer program.

The controller 60 supplies an uplink data signal to the radio transmitter 62, and the radio transmitter 62 transmits the uplink data signal to the serving base station using the transmission antenna 63. The reception quality measurer 70 measures PMIs, RIs, and SINRs based on radio signals, particularly CSI-RSs received by the radio receiver 64. The CSI reporter 71 generates a CQI based on a SINR, and supplies CSI that includes a PMI, an RI, and a CQI to the radio transmitter 62. The radio transmitter 62 transmits the CSI to the serving base station over a control channel.

The radio receiver 64 receives a desired data signal, a CSI-RS, a DM-RS, and a control signal (PDCCH signal) from the serving base station. If this UE is subjected to NOMA, the desired data signal addressed to the UE is included in a mixed data signal that is mixed with a non-orthogonal data signal (interference data signal) addressed to another UE. In this case, the radio receiver 64 receives, from the serving base station, a mixed data signal that includes multiple non-orthogonal data signals that have different powers and are addressed to multiple UEs in one-to-one correspondence.

The control signal recognizer 72 recognizes a PDCCH signal for the UE by using a C-RNTI allocated to this UE. By decrypting this PDCCH signal, the UE can find the MCS for each stream addressed to the UE. If a C-RNTI of another UE is notified from the base station 10, the control signal recognizer 72 can decrypt a PDCCH signal of the other UE through blind decoding by using the C-RNTI of this UE, and find the MCS for each stream addressed to the other UE.

The DM-RS recognizer 74 recognizes a DM-RS for each stream for the UE from the transmission antenna port for the DM-RS for the UE notified from the base station. The channel estimator 76 estimates an equivalent downlink channel matrix for the desired data signal (a result of multiplication of the channel matrix for the transmission channel from the base station to the UE and the precoding matrix for this UE) based on the DM-RS for each stream for the UE recognized by the DM-RS recognizer 74.

If the UE is subjected to NOMA, the DM-RS recognizer 74 also recognizes a DM-RS for each stream for another UE that is multiplexed through NOMA, based on the transmission antenna port for the DM-RS for the other UE to which the interference data signal is addressed, the transmission antenna port being notified from the base station. The channel estimator 76 estimates an equivalent downlink channel matrix for the interference data signal (a result of multiplication of the channel matrix for a transmission channel from the base station to the UE and the precoding matrix for the other UE to which the interference data signal is addressed) based on the DM-RS for each stream for the other UE recognized by the DM-RS recognizer 74.

The replica signal generator 78 operates in a case where the UE is subjected to NOMA. In this case, the radio receiver 64 receives, from the serving base station, a mixed data signal that includes multiple non-orthogonal data signals that have different powers and are addressed to multiple UEs in one-to-one correspondence. The replica signal generator 78 demodulates an interference data signal mixed with the desired data signal. In a case where SLIC is used, the replica signal generator 78 re-modulates a result of demodulation of the interference data signal and generates a replica signal of the interference data signal. In a case where CWIC is used, the replica signal generator 78 demodulates and decodes the interference data signal, and recodes and re-modulates the demodulation result to generate a replica signal of the interference data signal. To generate a replica signal, the replica signal generator 78 uses a PDCCH signal for another UE to which the interference data signal is addressed, and an equivalent channel matrix corresponding to the DM-RS for the other UE estimated by the channel estimator 76.

The correctness determiner 79 determines whether a result of demodulation or decoding of the interference data signal at the replica signal generator 78 is correct. In a case where SLIC is used, the correctness determiner 79 may determine whether the demodulation result is correct based on the SINR of a result of demodulation of the interference data signal, for example. Specifically, it may be determined that the demodulation result is correct if the SINR of the demodulation result is greater than a certain threshold value, and may be determined that the demodulation result is not correct in other cases.

Figure 9:
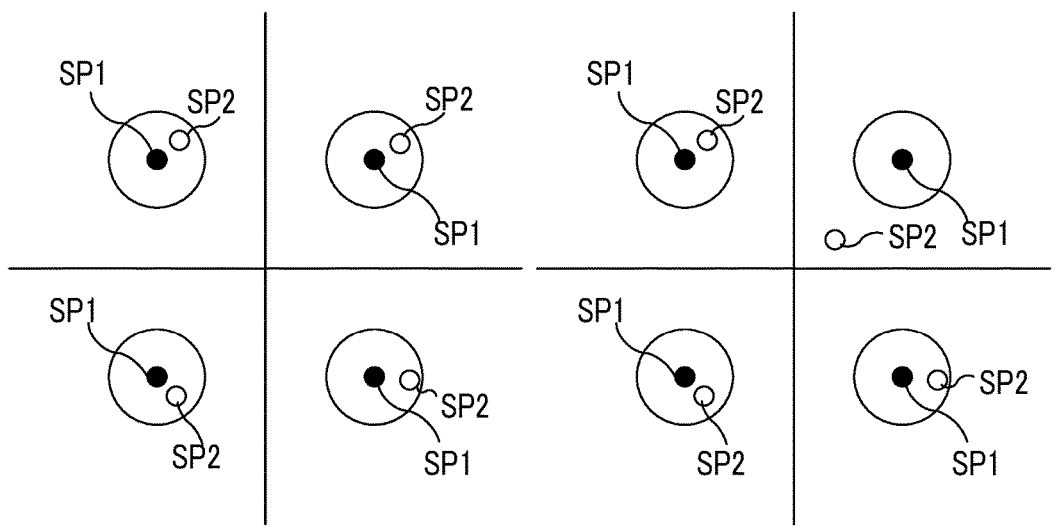
FIG. 9 is a diagram showing an exemplary method for determining whether a result of demodulating an interference data signal is correct.
Figure 10:
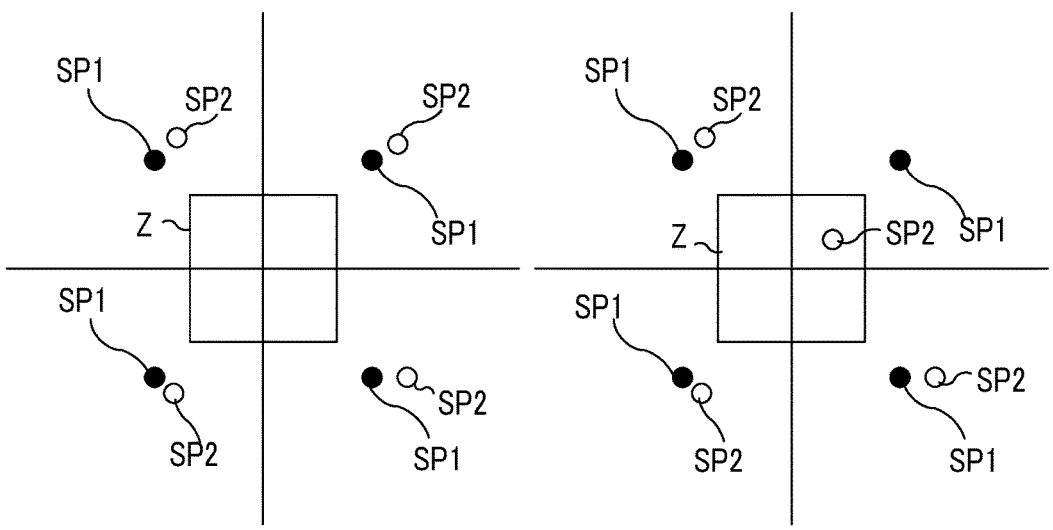
FIG. 10 is a diagram showing another exemplary method for determining whether a result of demodulating an interference data signal is correct.

In a case where SLIC is used, the correctness determiner 79 may determine whether the demodulation result is correct based on the Euclid distance between the signal point resulting from demodulating the interference data signal and the signal point of the pre-demodulation interference data signal. FIGS. 9 and 10 show exemplary techniques for making the determination regarding the demodulation result using hard decision that is based on the Euclid distance. FIGS. 9 and 10 are based on an assumption that QPSK is used as the modulation scheme. A sign SP1 denotes a signal point resulting from demodulation, and a sign SP2 denotes a pre-modulation signal point. If, as shown on the left side in FIG. 9, all of the pre-demodulation signal points SP2 are within a range of a certain distance from the signal points SP1 resulting from demodulation, it is determined that the demodulation result is correct. If, as shown on the right side in FIG. 9, at least one of the pre-demodulation signal points SP2 is not within the range of the certain distance from the signal points SP1 resulting from demodulation, it is determined that the demodulation result is not correct.

Alternatively, a square region Z may be defined within four signal points SP1, as shown in FIG. 10. If, as shown on the left side in FIG. 10, all of the pre-demodulation signal points SP2 are out of the region Z, it is determined that the demodulation result is correct. If, as shown on the right side in FIG. 10, at least one of the pre-demodulation signal points SP2 is within the region Z, it is determined that the demodulation result is not correct.

In a case where the SLIC is used, the replica signal generator 78 may use soft decision to demodulate the interference data signal. That is, the replica signal generator 78 may obtain a soft decision value for each bit of the interference data signal. The correctness determiner 79 may determine that the soft decision value for each bit of the interference data signal is correct if the soft decision value for a result of demodulating that bit is within a range of a given threshold value from 1 or 0.

In a case where the CWIC is used, the correctness determiner 79 performs error detection processing such as a parity check or a CRC (cyclic redundancy check) on a result of demodulating the interference data signal, and determines whether the demodulation result is correct based on a result of the error detection processing. If a result of demodulation or decoding of the interference data signal is correct, the replica signal generated by the replica signal generator 78 is correct. If the demodulation result or the decoding result is not correct, the replica signal generated by the replica signal generator 78 is not correct. Accordingly, it can be said that the correctness determiner 79 determines whether the replica signal is correct.

The non-orthogonal signal canceler (interference canceler) 80 operates in a case where the UE is subjected to NOMA. If the correctness determiner 79 determines that a result of demodulation or decoding of the interference data signal is correct, the non-orthogonal signal canceler 80 cancels out the replica signal generated by the replica signal generator 78 from the mixed data signal. If the correctness determiner 79 determines that a result of demodulation or decoding of the interference data signal is not correct, the non-orthogonal signal canceler 80 does not cancel out the replica signal generated by the replica signal generator 78 from the mixed data signal.

If the UE is subjected to NOMA, and if the correctness determiner 79 determines that the demodulation result or the decoding result is correct, the desired data signal demodulator/decoder 82 demodulates and decodes the desired data signal from the signal output from the non-orthogonal signal canceler 80 (the mixed data signal from which the replica signal has been canceled out). In this case, the power of the interference data signal is higher than the power of the desired data signal in the mixed data signal received by the radio receiver 64. For this reason, it is appropriate to demodulate and decode the desired data signal from the mixed data signal from which the replica signal has been canceled out.

If the UE is subjected to NOMA, and if the correctness determiner 79 determines that a result of demodulation or decoding of the interference data signal is not correct, the desired data signal demodulator/decoder 82 demodulates and decodes the desired data signal from the mixed data signal received by the radio receiver 64. In this case, the power of the desired data signal is higher than the power of the interference data signal in the mixed data signal received by the radio receiver 64. For this reason, it is appropriate to demodulate and decode the desired data signal from the mixed data signal received by the radio receiver 64.

If the UE is not subjected to NOMA, the desired data signal demodulator/decoder 82 demodulates and decodes the desired data signal received by the radio receiver 64. In any case, in demodulating and decoding the desired data signal, the desired data signal demodulator/decoder 82 uses a PDCCH signal for the UE that is recognized by the control signal recognizer 72, and an equivalent channel matrix that is estimated by the channel estimator 76 and corresponds to a DM-RS for the UE.

The serving base station signals to the UE as to whether the UE is subjected to NOMA. As mentioned above, the base station 10 notifies, to multiple UEs subjected to NOMA, the transmission antenna ports of the base station used in transmitting DM-RSs for the multiple UEs that are subjected to NOMA. Accordingly, each UE can recognize a DM-RS for that UE and a DM-RS for another UE.

To the multiple UEs that are subjected to NOMA, the base station 10 does not transmit information regarding transmission powers allocated to the respective UEs or information indicating the necessity of demodulating, from a mixed data signal received by each UE, an interference data signal addressed to another UE and canceling out a replica signal corresponding to the interference data signal. The UE does not receive information regarding the power allocated to the UE or information indicating the necessity of canceling out the interference data signal. Accordingly, downlink signaling between the base station 10 and the UEs can be reduced.

Figure 11:
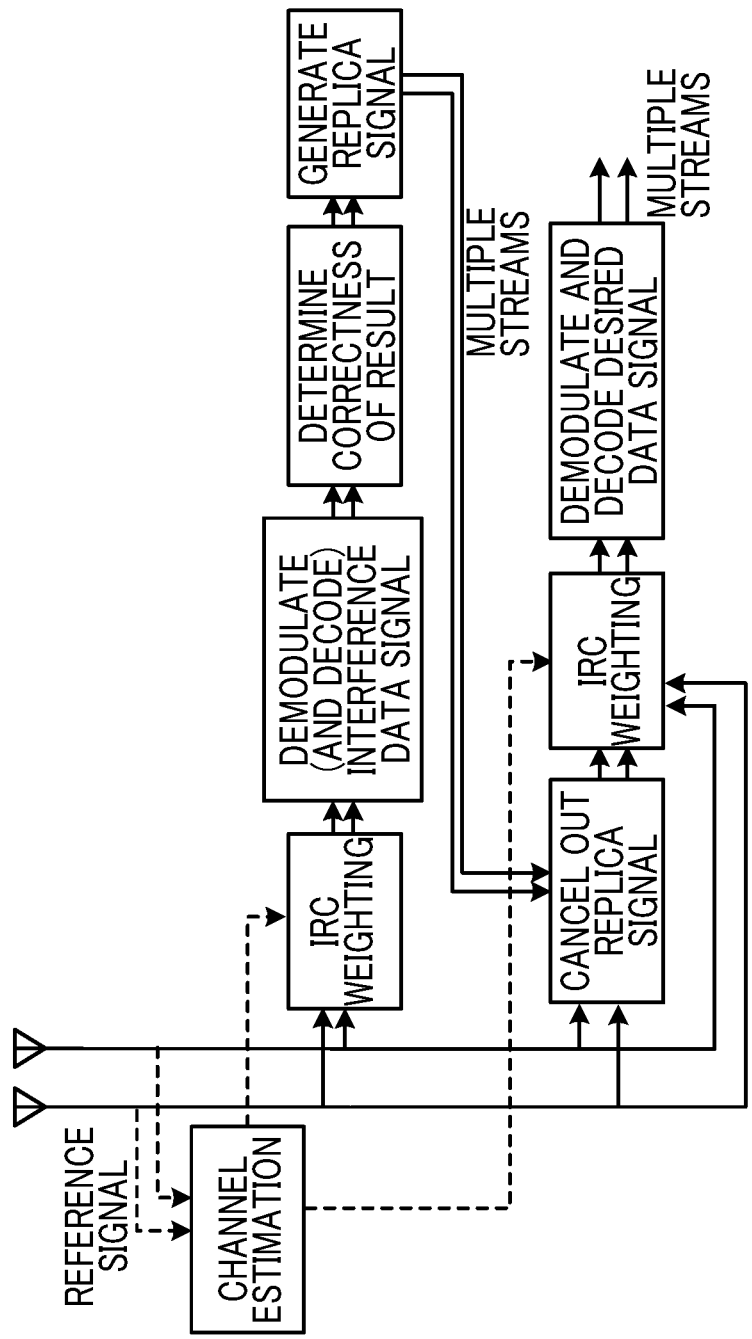
FIG. 11 is a block diagram showing details of some functions of the user equipment.

A description will be given, with reference to FIG. 11, of details of functions of the UE for canceling out interference and decoding a desired data signal. As shown in FIG. 11, the channel estimator 76 performs channel estimation based on reference signals received by the two reception antennas 65. As mentioned above, in demodulating an interference data signal and decoding a desired data signal, each UE may use a DM-RS that is unique to each UE, or alternatively use a CSI-RS or a CRS that is shared by multiple UEs.

Two transmission antennas of one base station 10 transmitting two streams to each of two UEs can be considered to be 2×2 MIMO. In this case, the signal received by each UE, Y, is a 2×1 matrix, and is expressed by Equation (7) below:

$$Y = H_D W_D \sqrt{P_D} S_D + H_D W_I \sqrt{P_I} S_I + N_D \qquad (7)$$

Here, $H_D$ indicates a channel matrix for a transmission channel from the base station 10 to the UE, and is a 2×2 matrix in 2×2 MIMO. $W_D$ indicates a precoding matrix for the UE, and is a 2×2 matrix in 2×2 MIMO. $W_I$ indicates a precoding matrix for another UE to which the interference data signal is addressed, and is a 2×2 matrix in 2×2 MIMO. $S_D$ is a 1×2 matrix indicating transmission data symbols addressed to the UE. $S_I$ is a 1×2 matrix indicating transmission data symbols addressed to the other UE.

$P_D$ indicates a transmission power that is set for a stream addressed to the UE by the base station 10, and $P_I$ indicates a transmission power that is set, at the base station 10, for a stream addressed to the other UE to which the interference data signal is addressed.

$N_D$ indicates an interference power from another base station and additive white Gaussian noise at the UE.

Equation (7) can be rearranged into Equation (8).

$$Y = H_{ED} S_D + H_{EI} S_I + N_D \qquad (8)$$

Here, $H_{ED}$ indicates an equivalent channel matrix for a desired signal at the UE, and is expressed by Equation (9).

$$H_{ED} = H_D W_D \sqrt{P_D} \qquad (9)$$

$H_{EI}$ indicates an equivalent channel matrix at the UE for a signal (interference data signal) addressed to the other UE, and is expressed by Equation (10).

$$H_{EI} = H_D W_I \sqrt{P_I} \qquad (10)$$

The first term on the right side of Equation (8) corresponds to a desired signal for the UE, and the second term on the right side corresponds to a signal (interference data signal) that is received by the UE and is addressed to the other UE.

The channel estimator 76 estimates an equivalent channel matrix for the desired signal at the UE, $H_{ED}$, and an equivalent channel matrix for the interference data signal at the UE, $H_{EI}$.

The replica signal generator 78 uses the mixed data signal received by the two reception antennas 65, and executes IRC (interference rejection combining) weighting in order to reduce an unnecessary signal (here, desired data signal). In a case where the SLIC is used, the replica signal generator 78 uses the signal resulting from IRC weighting to demodulate the interference data signal. In a case where the CWIC is used, the replica signal generator 78 uses the signal resulting from IRC weighting to demodulate and decode the interference data signal. In a case where the interference data signal is transmitted in multiple streams, the replica signal generator 78 performs IRC weighting on each stream.

IRC weighting includes obtaining, from the aforementioned equivalent channel matrix, an IRC weighting matrix for reducing the unnecessary signal (desired data signal) before demodulating the interference data signal by using an MMSE (minimum mean squared error) algorithm, and multiplying the mixed data signal by that IRC weighting matrix, for example.

The IRC weighting matrix to be used before demodulating the interference data signal $U_1$ is calculated based on Equation (11).

$$U_1 = H_{EI}^H (H_{ED} H_{ED}^H + H_{EI} H_{EI}^H + \sigma^2 I)^{-1} \tag{11}$$

In Equation (11), the superscript H indicates a complex conjugate transpose. $\sigma^2$ indicates a noise power at the UE, and $\sigma$ indicates a standard deviation of this noise power. I indicates a unit matrix.

In a case where the interference data signal is transmitted in one stream, the IRC weighting matrix is a 1×2 matrix. The equivalent channel matrix for the interference data signal $H_{EI}$ is a 2×1 matrix. The complex conjugate transpose thereof $H_{EI}^H$ is a 1×2 matrix. $H_{ED} H_{ED}^H$ is a 2×2 matrix. $H_{EI} H_{EI}^H$ is a 2×2 matrix.

In a case where the interference data signal is transmitted in two streams, the IRC weighting matrix is a 2×2 matrix. The equivalent channel matrix for the interference data signal $H_{EI}$ is a 2×2 matrix. The complex conjugate transpose thereof $H_{EI}^H$ is a 2×2 matrix. $H_{ED} H_{ED}^H$ is a 2×2 matrix. $H_{EI} H_{EI}^H$ is a 2×2 matrix.

Accordingly, the replica signal generator 78 switches the IRC weighting matrix for reducing the unnecessary signal (desired data signal) before demodulating the interference data signal in accordance with the number of streams of the interference data signal transmitted from the base station 10. In the IRC weighting matrix before demodulating the interference data signal, the replica signal generator 78 uses a result of channel estimation for the reference signal for the UE and a result of channel estimation for the reference signal for the other UE.

The replica signal generator 78 multiplies the mixed data signal by the IRC weighting matrix, reduces components of the desired data signal, and thereafter uses the signal resulting from the multiplication to demodulate (and also decode when CWIC is used) the interference data signal.

The correctness determiner 79 determines whether a result of demodulation (or decoding) of the interference data signal is correct. In a case where the interference data signal is transmitted in two streams, the correctness determiner 79 determines, for each stream, whether the demodulation result (or decoding result) is correct. In a case where the SLIC is used, if the correctness determiner 79 determines that the demodulation result is correct, the replica signal generator 78 re-modulates the demodulation result and generates a replica signal. In a case where the CWIC is used, if the correctness determiner 79 determines that the demodulation result is correct, the replica signal generator 78 recodes and re-modulates the demodulation result and generates a replica signal. In a case where the interference data signal is transmitted in two streams, the replica signal generator 78 generates a replica signal of two streams. If the correctness determiner 79 determines that the demodulation result (or decoding result) is not correct, the replica signal generator 78 does not generate a replica signal.

If the correctness determiner 79 determines that the demodulation result or the decoding result is correct, the non-orthogonal signal canceler 80 cancels out the replica signal generated by the replica signal generator 78 from the mixed data signal received by the reception antennas 65. If the correctness determiner 79 determines that the demodulation result or the decoding result is not correct, the non-orthogonal signal canceler 80 does not cancel out the replica signal generated by the replica signal generator 78 from the mixed data signal.

If the UE is subjected to NOMA, and if the correctness determiner 79 determines that the demodulation result or the decoding result is correct, the desired data signal demodulator/decoder 82 demodulates and decodes the desired data signal from the signal output from the non-orthogonal signal canceler 80 (the mixed data signal from which the replica signal has been canceled out). If the UE is subjected to NOMA, and if the correctness determiner 79 determines that the demodulation result or the decoding result is not correct, the desired data signal demodulator/decoder 82 demodulates and decodes the desired data signal from the mixed data signal received by the reception antennas 65.

The desired data signal demodulator/decoder 82 executes IRC weighting to reduce an unnecessary signal (here, interference data signal) before demodulating the desired data signal. In a case where the desired data signal is transmitted in multiple streams, the desired data signal demodulator/decoder 82 performs IRC weighting on each stream.

IRC weighting includes obtaining, from the aforementioned equivalent channel matrix, an IRC weighting matrix for reducing the unnecessary signal (interference data signal) before demodulating the desired data signal by using an MMSE algorithm, and multiplying the mixed data signal or the desired data signal by that IRC weighting matrix.

The IRC weighting matrix $U_2$, which is used before demodulating the mixed data signal (desired data signal) in a case where the correctness determiner 79 determines that the demodulation result or the decoding result is not correct, is calculated based on Equation (12).

$$U_2 = H_{ED}^H (H_{ED} H_{ED}^H + H_{EI} H_{EI}^H + \sigma^2 I)^{-1} \tag{12}$$

On the other hand, the IRC weighting matrix $U_3$, which is used before demodulating the mixed data signal (desired data signal) from which the replica signal has been canceled out in a case where the correctness determiner 79 determines that the demodulation result or the decoding result is correct, is calculated based on Equation (13).

$$U_3 = H_{ED}^H (H_{ED} H_{ED}^H + \sigma^2 I)^{-1} \tag{13}$$

In a case where the desired data signal is transmitted in one stream, the IRC weighting matrix is a 1×2 matrix. The equivalent channel matrix for the desired data signal $H_{ED}$ is a 2×1 matrix. The complex conjugate transpose thereof $H_{ED}^H$ is a 1×2 matrix. $H_{ED} H_{ED}^H$ is a 2×2 matrix. $H_{EI} H_{EI}^H$ is a 2×2 matrix.

In a case where the desired data signal is transmitted in two streams, the IRC weighting matrix is a 2×2 matrix. The equivalent channel matrix for the interference data signal $H_{ED}$ is a 2×2 matrix. The complex conjugate transpose thereof $H_{ED}^H$ is a 2×2 matrix. $H_{ED} H_{ED}^H$ is a 2×2 matrix. $H_{EI} H_{EI}^H$ is a 2×2 matrix.

Accordingly, the desired data signal demodulator/decoder 82 switches the IRC weighting matrix for reducing the unnecessary signal (interference data signal) before demodulating the desired data signal in accordance with the number of streams of the desired data signal transmitted from the base station 10. The desired data signal demodulator/decoder 82 uses at least a result of channel estimation for the reference signal for the UE, in the IRC weighting matrix before demodulating the interference data signal.

If the correctness determiner 79 determines that a result of demodulation or decoding of the interference data signal is not correct, the desired data signal demodulator/decoder 82 multiplies the mixed data signal by the IRC weighting matrix $U_2$. If the correctness determiner 79 determines that the result of demodulation or decoding of the interference data signal is correct, the desired data signal demodulator/decoder 82 multiplies the mixed data signal from which the replica signal has been canceled out by the IRC weighting matrix $U_3$.

Then, the desired data signal demodulator/decoder 82 demodulates and decodes the desired data signal from the multiplication result.

As described above, in a case where the UE according to this embodiment is subjected to NOMA and receives a mixed data signal that includes multiple non-orthogonal data signals, the UE demodulates (and also decodes, depending on the case) a replica signal of the interference data signal included in the mixed data signal regardless of the allocation of transmission powers at the base station. If the demodulation result or the decoding result, i.e., the replica signal, is correct, the UE decodes the desired data signal from the mixed data signal from which the replica signal corresponding to the interference data signal has been canceled out by an interference canceler. If the demodulation result or the decoding result, i.e., the replica signal, is not correct, the UE decodes the desired data signal from the mixed data signal without using an interference canceler. Accordingly, the desired data signal can be appropriately decoded independent of a result of transmission power allocation to the multiple UEs at the base station.

In conventional NOMA, each UE needs to know the necessity of canceling out an interference component addressed to another UE from a received signal. For this purpose, information regarding the transmission power allocated to the UE by the base station or information indicating the necessity of canceling out the interference component needs to be transmitted to each UE. However, the UE according to this embodiment demodulates (and also decodes, depending on the case) the interference data signal included in the mixed data signal regardless of the allocation of transmission powers at the base station. Accordingly, the UE does not need to know the necessity of canceling out the interference data signal addressed to another UE from the mixed data signal. As a result, the base station does not transmit the information regarding the transmission power allocated to the UE or the information indicating the necessity of canceling out the interference data signal addressed to another UE from the mixed data signal received by each UE. Thus, downlink signaling is reduced.

In a case where an interference data signal is transmitted in two streams, there may be cases where the correctness determiner 79 determines that the demodulation result (or decoding result) is correct for one of the streams, and determines that the demodulation result (or decoding result) is not correct for the other of the streams. In such cases, a configuration may be employed in which a replica signal is generated for only the stream of the interference data signal for which it is determined that the demodulating result is correct and is canceled out from the mixed data signal, and a replica signal is not generated and canceled out for the stream of the interference data signal for which it is determined that the demodulation result is not correct. Alternatively, the desired data signal demodulator/decoder 82 may demodulate and decode the desired data signal from the mixed data signal received by the reception antennas 65 without generating and canceling out replica signals for both streams of the interference data signals.

Other Modifications

In the above embodiment, the SLIC and the CWIC were taken as examples of the interference canceler to be used in the UE. However, an interference canceler using maximum likelihood (ML) may also be used. This interference canceler jointly estimates a desired signal and interference signal at the symbol level (i.e., for each RE).

The case where two UEs are multiplexed through NOMA has been mainly described above. However, the present invention is not limited to such cases, and a person skilled in the art can appreciate that three or more UEs may be multiplexed through NOMA. In a case where three or more UEs are multiplexed through NOMA, the number of times that an interference data signal is demodulated and a replica signal is canceled out is greater, and the IRC weighting is more complicated than in the above description.

The functions executed by the CPU in each of the base station and the UE may be executed by hardware instead of the CPU. For example, those functions may be executed by programmable logic devices, such as FPGAs (Field Programmable Gate Arrays) or DSPs (Digital Signal Processors).

DESCRIPTION OF REFERENCE SIGNS 1, 2, 100 to 105 UE (user equipment)
30 controller
32 radio transmitter
33 transmission antenna
34 radio receiver
35 reception antenna
36 inter-base station communicator
38 CSI reporting processer
40 DM-RS generator
42 CSI-RS generator
44 control signal generator
46 scheduler (stream number determiner, candidate determiner, signal to interference plus noise power ratio estimator, scheduling metric calculator, user equipment determiner, predictive modulation-coding scheme determiner, formal modulation-coding scheme determiner)
48 downlink transmission power determiner
50 stream transmission power determiner
52 precoder
54 provisional MCS (modulation-coding scheme) determiner
56 predictive throughput calculator (predictive index estimator)
60 controller
62 radio transmitter
63 transmission antenna
64 radio receiver
65 reception antenna
70 reception quality measurer
71 CSI reporter
72 control signal recognizer
74 DM-RS recognizer
76 channel estimator
78 replica signal generator
80 non-orthogonal signal canceler (interference canceler)
79 correctness determiner
82 desired data signal demodulator/decoder (desired data signal decoder)

The invention claimed is:

1. A user equipment comprising:

a receiver that receives information indicating a transmission antenna port for a demodulation reference signal associated with a second downlink signal for another user equipment, wherein the second downlink signal is superposed with a first downlink signal for the subject user equipment and is interfering with respect to the first downlink signal; and a controller that controls a receiving process of the second downlink signal based on the information indicating the transmission antenna port for the demodulation reference signal associated with the second downlink signal, wherein the information further indicates that a starting symbol for the first downlink signal and a starting symbol for the second downlink signal are the same.

2. A radio base station comprising:

a transmitter that transmits a first downlink signal for a first user equipment and a second downlink signal for a second user equipment, the second downlink signal being superposed with the first downlink signal; and a controller that controls each of transmission antenna ports for a demodulation reference signal associated with the first downlink signal and a demodulation reference signal associated with the second downlink signal, respectively, wherein the transmitter transmits, to the first user equipment, information indicating the transmission antenna port for the demodulation reference signal associated with the second downlink signal, which is interfering with respect to the first downlink signal, and wherein the information further indicates that a starting symbol for the first downlink signal and a starting symbol for the second downlink signal are the same.

* * * * *